(12) United States Patent
Tsukuda

(10) Patent No.: US 6,348,854 B1
(45) Date of Patent: Feb. 19, 2002

(54) RADIO SELECTIVE-CALLING RECEIVER

(75) Inventor: Naoki Tsukuda, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/271,263

(22) Filed: Mar. 17, 1999

(30) Foreign Application Priority Data

Mar. 26, 1998 (JP) ............................................. 10-079358

(51) Int. Cl.$^7$ .............................. H04B 7/00; H04Q 3/02; H04Q 9/14
(52) U.S. Cl. ...................................... 340/7.29; 340/7.28
(58) Field of Search ................................ 455/38.5, 38.3, 455/343, 574, 38.1, 38.2, 38.4; 340/7.2, 7.28, 7.29

(56) References Cited

U.S. PATENT DOCUMENTS 6,052,564 A * 4/2000 Toriya ........................ 455/38.3
6,097,933 A * 8/2000 Bennett et al. ............ 455/38.3
6,205,343 B1 * 3/2001 Montgomery, Jr. ......... 455/574

FOREIGN PATENT DOCUMENTS

| GB | 2 281 796 | 3/1995 |
| JP | 3-226029 | 10/1991 |
| JP | 7-87540 | 3/1995 |
| JP | 9-84084 | 3/1997 |
| JP | 10-51829 | 2/1998 |

* cited by examiner

Primary Examiner—Dwayne Bost
Assistant Examiner—Lewis West
(74) Attorney, Agent, or Firm—Young & Thompson

(57) ABSTRACT

A radio selective-calling receiver, which avoids the influence of the noise and the deterioration of the characteristic of a radio section generated at the time when a received calling is informed to a user, and avoids the increase of cost and the large sized apparatus, is provided. At the time when the radio section is on state, a vibrator is separated from a power supply and the operation noise of the vibrator is not transmitted to the line of the power supply and the voltage drop of the power supply by the current of the vibrator is not also generated.

8 Claims, 9 Drawing Sheets

RADIO SELECTIVE-CALLING RECEIVER

BACKGROUND OF THE INVENTION

The present invention relates to a radio selective-calling receiver which in particular avoids troubles generated at the time when a received calling is informed to a user.

DESCRIPTION OF THE RELATED ART

Generally, at a radio selective-calling receiver, in order to extend the battery life, a radio section of the radio selective-calling receiver is intermittently operated and is turned on at the time when a signal having its own ID number is received, and the radio selecting-calling receiver takes in the data. However, a control section of the radio selective-calling receiver is always operated in order to take timing.

At the time when its own ID number is detected from the received data, a received calling is informed to the user by a sound from a speaker or the flashing of LED or the vibration of a vibrator and so forth. The information of the vibration of the vibrator is generated by making a decentering weight fixed at a motor rotate in general and the received calling is informed. This method is effective at the place where such as the inside of a factory having big noise or at the time during a meeting or some public facilities where the received sound makes the public bother.

FIG. 1 is a block diagram showing the construction of the conventional radio selective-calling receiver. This radio selective-calling receiver is constituted of a radio section 801 which amplifies and demodulates signals received at an antenna 807, a controller 802 which outputs control signals that makes this radio section 801 intermittently operate, and makes a vibrator 803 operate by switching on a switch 804 at the time received a calling for a user, a power supply 805 which supplies power to the radio section 801, the controller 802 and the vibrator 803 through the switch 804, and an operating section 806 at which a user implements various kinds of operation.

FIG. 2 is a diagram showing main control signals outputting from the controller 802. As shown in FIG. 2, the controller 802 controls the intermittent operation of the radio section 801 with a radio section control signal and controls the vibrator 803 with a receiving information signal. This receiving information signal is outputted at the time when its own ID number is detected in the received data.

FIG. 3 is a timing chart showing the operation of this radio selective-calling receiver. FIG. 3(a) shows the POCSAG (post office code standardization advisory group) signal format being an example of the signal format of the radio selective-calling receiver. This POCSAG signal format is constituted of a preamble and plural batches and the batch is composed of a synchronization signal SC and eight frames.

FIG. 3(b) shows the operation timing (a radio section control signal) of the radio section 801. First, the preamble being the repetition of "1" and "0" is detected and after detecting the preamble, the detecting operation of the synchronization signal SC is implemented. After finishing the detection of the synchronization signal SC, the controller 802 decides at which frame of eight frames to make the radio section 801 turn on by its own ID number. In this case, the radio section 801 becomes turning on at the third frame. At and after the second batch, the synchronization signal SC is not received and at the third frame the radio section 801 becomes turning on.

FIG. 3(c) shows a receiving information signal at the case that its own ID number is detected at the third frame of the first batch. With this receiving information signal, the switch 804 becomes switching on and the vibrator 803 and the power supply are connected and the vibrator 803 is driven. FIG. 3(d) shows the operation timing of the vibrator 803 at this time.

As it is clear from FIG. 3(b) and FIG. 3(d), there is no relationship between the operation of the radio section 801 and the operation of the vibrator 803, even at the time during the radio section 801 is on state, the vibrator 803 is operating. Therefore, there is a problem that the noise generated by the operation of the vibrator 803 is transmitted to the radio section 801 through the power supply line and this causes a bad effect such as the deterioration of the sensitivity of the radio section 801. Furthermore, a big current flows in the vibrator 803 and a voltage drop occurs at the power supply 805, therefore there is another problem that the operating characteristic of the radio section 801 becomes unstable.

In order to solve the problem of the deterioration of the characteristic of the radio section caused by the operating noise of the vibrator, for example the Japanese Patent Application Laid-Open No. HEI 3-226029 discloses the following apparatus.

FIG. 4 is a block diagram showing the construction of this radio selective-calling receiver of the conventional type. This radio selective-calling receiver provides another power supply for the vibrator. However, the main control signals and the timing chart are completely the same as ones stated in the FIGS. 2 and 3.

As shown in FIG. 4, the voltage of a power supply 1150 is boosted by a DC/DC converter 1190 and a secondary battery 1100 is charged through a diode 1180 and this secondary battery 1100 is used for a power supply of a vibrator 1130. According to this, the power supply of a radio section 1110 and the power supply of the vibrator 1130 are separated, as a result, the operation noise of the vibrator 1130 does not influence the radio section 1110 completely.

To solve the unstable operation of the radio section caused by the voltage drop of the power supply at the time when the vibrator is operating, for example the Japanese Patent Application Laid-Open No. HEI 7-87540 discloses a following apparatus.

FIG. 5 is a block diagram showing the construction of this radio selective-calling receiver. In this, a vibrator 1290 is controlled by a rectangular wave.

However, even in the radio selective-calling receiver disclosed by the Japanese Patents Application Laid-Open No. HEI 3-226029 and HEI 7-87540, there are following problems.

In the radio selective-calling receiver disclosed by the Japanese Patent Application Laid-Open No. HEI 3-226029, as shown in FIG. 4, at the time when the vibrator 1130 is operated, the current over the operating current of the vibrator 1130 flows in the DC/DC converter 1190 for boosting voltage, therefore the voltage drop of the power supply 1150 becomes big and the operation of the radio section 1110 becomes further unstable. And the secondary battery 1100, the diode 1180 and the DC/DC converter 1190 must be added, with this, the cost increases and the big sized apparatus is not avoided.

In the radio selective-calling receiver disclosed by the Japanese Patent Application Laid-Open No. HEI 7-87540, as shown in FIG. 5, the operation of the radio section 1220 and of the vibrator 1290 have no relationship, even at the time when the radio section is on state, the vibrator 1290 operates, therefore the operation noise of the vibrator 1290 is transmitted to the radio section 1220 through the power supply line and the bad effect such as the deterioration of the sensitivity influencing to the radio section 1220 is not improved. By controlling with a rectangular wave, on the contrary the operating noise of the vibrator 1290 is increased and there is a possibility that the influence giving to the radio section 1220 becomes big.

SUMMARY OF THE INVENTION

It is therefore an object of the present invention to provide a radio selective-calling receiver which avoids the influence of noise and the deterioration of the characteristic of the radio section generated at the time of informing a calling to a user, and avoids the increase of cost and the large size.

According to a first aspect of the present invention, for achieving the above mentioned objects, a radio selective-calling receiver provides a signal receiving means for receiving transmitted signals, a informing means for informing the reception to the user at the time when said signal receiving means receives its own calling, a power supply for supplying the power to said signal receiving means and said informing means and a control means for implementing the breaking control which breaks the supply of power to said informing means from said power supply during the time when said signal receiving means operates.

According to a second aspect of the present invention, at the radio selective-calling receiver, said control means controls said breaking control with a first control signal which is outputted to said signal receiving means and makes said signal receiving means operate intermittently, and with a second control signal which is generated by that said signal receiving means receives a calling.

According to a third aspect of the present invention, at the radio selective-calling receiver, said control means generates a third control signal indicating the operation of said informing means during the time that said first control signal indicates "off" of the operation of said signal receiving means, and implements said breaking control, using said first and second control signals.

According to a fourth aspect of the present invention, at the radio selective-calling receiver, said control means indicates the period, which said third control signal indicates the operation of said informing means, by synchronizing with the period, which said first control signal indicates "off" of the operation of said signal receiving means.

According to a fifth aspect of the present invention, at the radio selective-calling receiver, said control means implements said breaking control using with a logic circuit.

According to a sixth aspect of the present invention, at the radio selective-calling receiver, said informing means informs said received calling using with at least one of a vibrator, a speaker and an LED.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
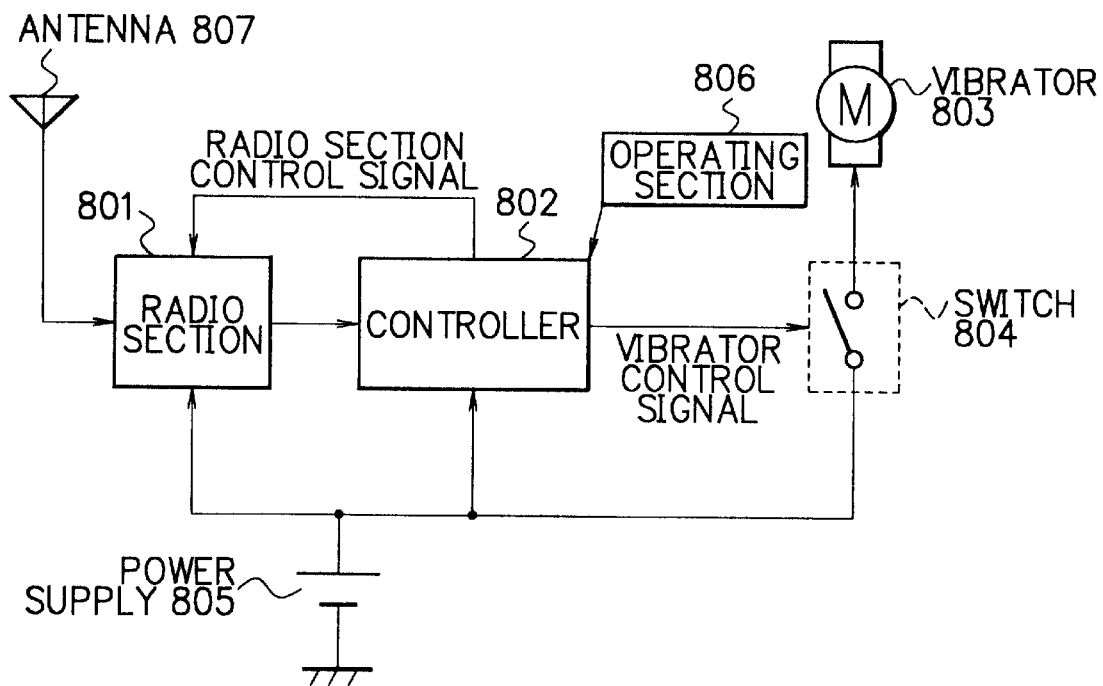
FIG. 1 is a block diagram showing the construction of the conventional radio selective-calling receiver.
Figure 2:
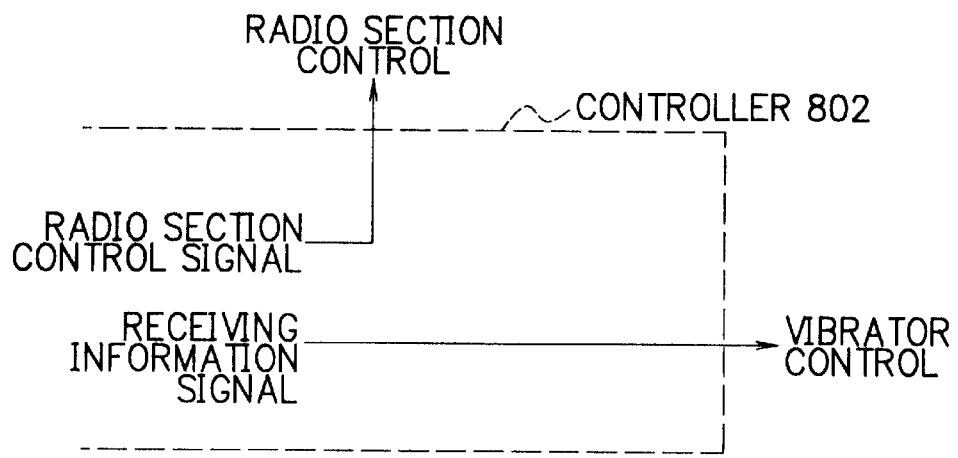
FIG. 2 is a diagram showing main control signals outputting from the controller of the conventional type.
Figure 3:
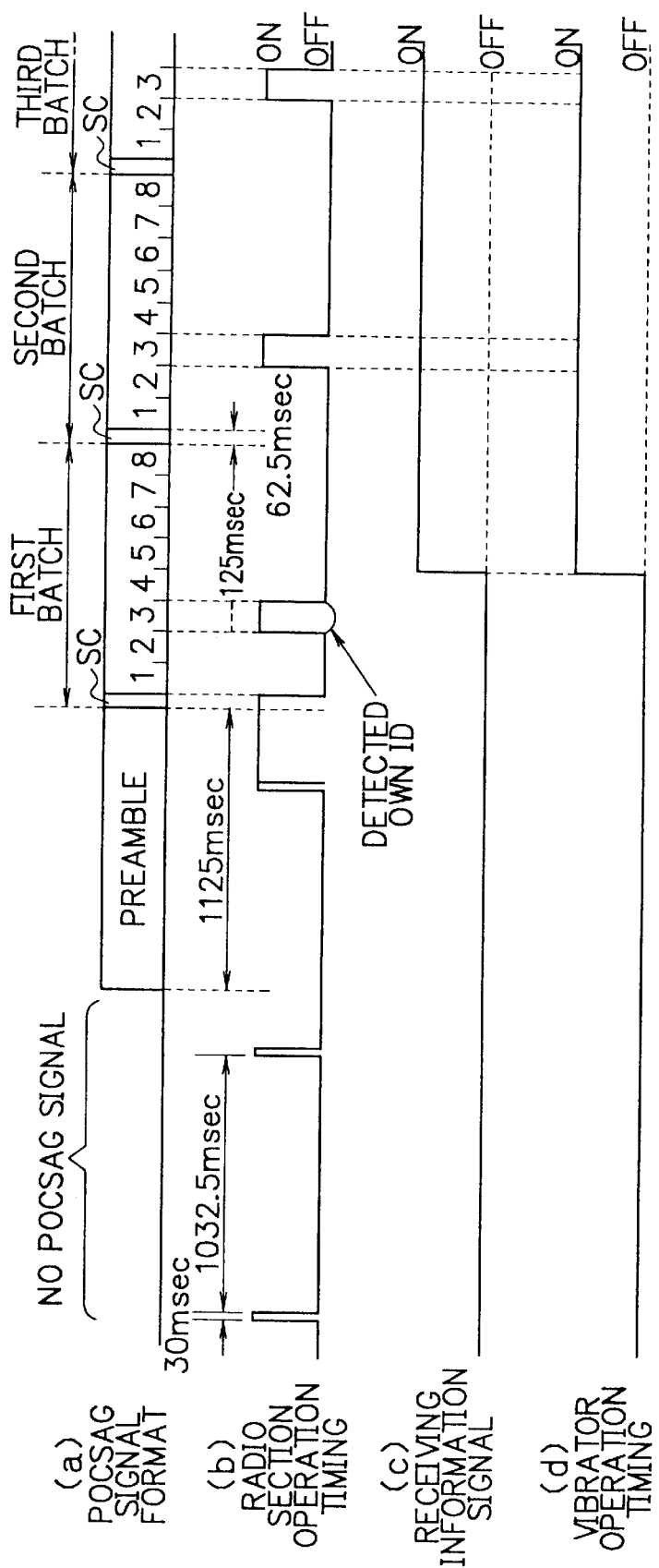
FIG. 3 is a timing chart showing the operation of the radio selective-calling receiver of the conventional type.
Figure 4:
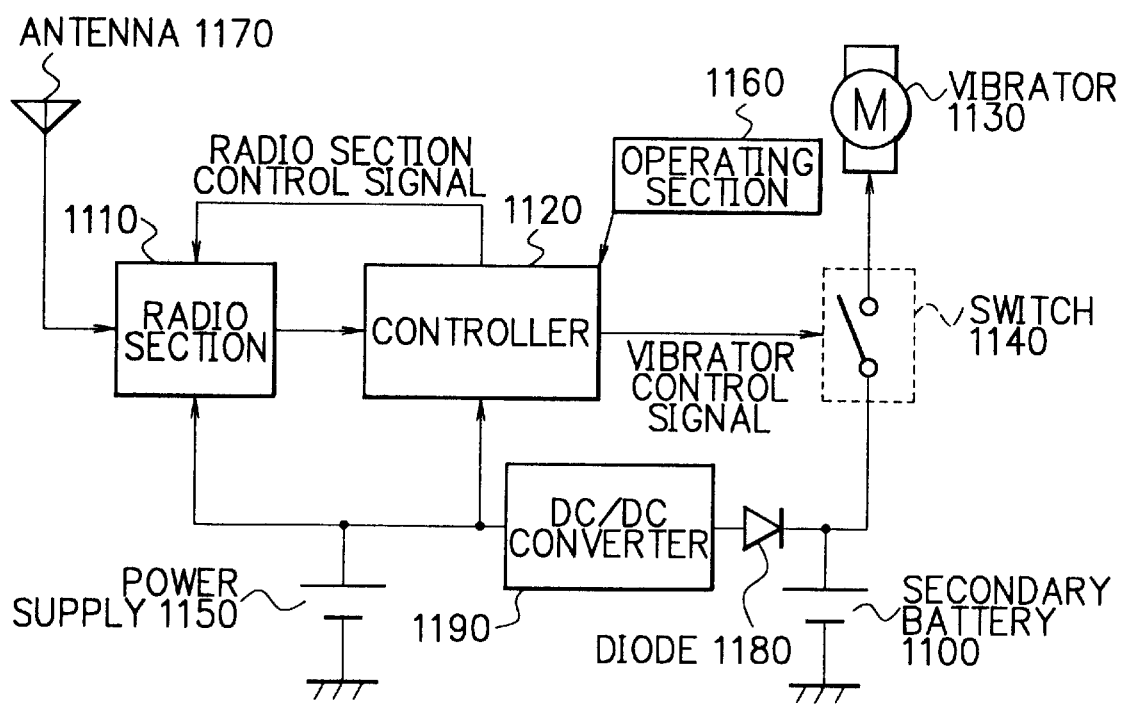
FIG. 4 is a block diagram showing the construction of the radio selective-calling receiver of the Japanese Patent Application Laid-Open No. HEI 3-226029.
Figure 5:
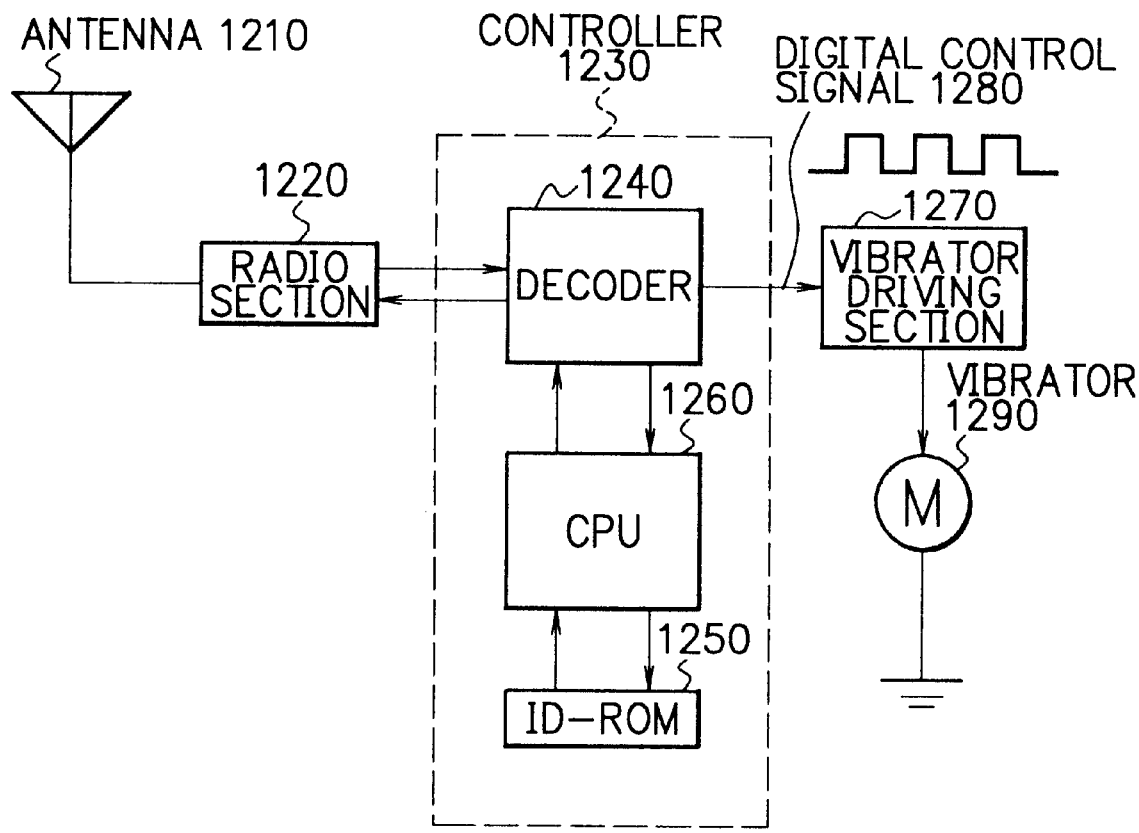
FIG. 5 is a block diagram showing the construction of the radio selective-calling receiver of the Japanese Patent Application Laid-Open No. HEI 7-87540.
Figure 6:
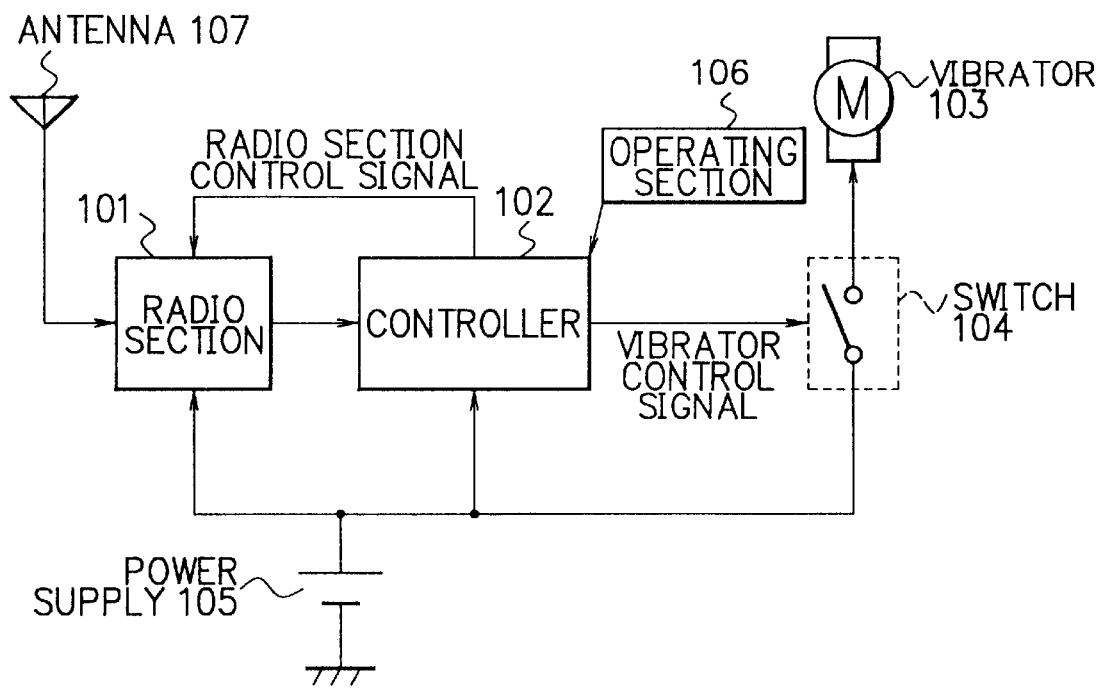
FIG. 6 is a block diagram showing the construction of the present invention.

Referring now to the drawings, embodiments of the present invention are explained in detail. FIG. 6 is a block diagram showing the construction of the present invention. In order to make the understanding of the present invention easy, the present invention providing only a vibrator as a method of informing a received calling is explained.

As shown in FIG. 6, the radio selective-calling receiver of the present invention provides a radio section 101 which amplifies and demodulates signals received at an antenna 107, a controller 102 which outputs control signals that makes this radio section 101 intermittently operate, and makes a vibrator 103 operate by switching on a switch 104 at the time received a calling for a user, a power supply 105 which supplies power to the radio section 101, the controller 102 and the vibrator 103 through the switch 104, and an operating section 106 at which a user implements various kinds of operation.

Figure 7:
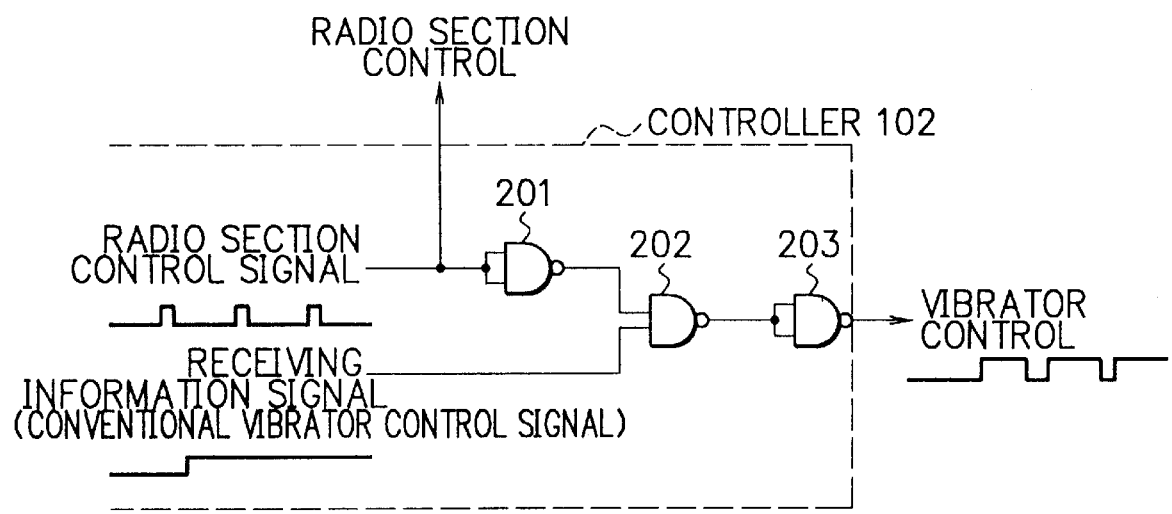
FIG. 7 is a diagram showing a logic circuit in the controller to make a control signal for the vibrator.

FIG. 7 is a diagram showing a logic circuit in the controller 102 to make a control signal for the vibrator 103. As shown in FIG. 7, NAND gates 201, 202 and 203 are provided in the controller 102. The NAND gate 201 outputs NOT of a radio section control signal, the NAND gate 202 outputs NOT of the value being AND of the output of NAND gate 201 and the receiving information signal, and the NAND gate 203 outputs NOT of the output of the NAND gate 202. With this construction, the controller 102 controls the intermittent operation of the radio section 101 with the radio section control signal and controls the vibrator 103 with this radio section control signal and the receiving information signal.

This receiving information signal is a signal that is outputted at the time when its own ID number is detected in the received data, the details of this receiving information signal are explained later. Generally, the controller 102 is made of IC, it is easy to add three NAND gates to the inside of this IC. And with this addition, making an apparatus large is avoided. Moreover, using the conventional radio section control signal and receiving information signal, the vibrator control signal is generated by the additional logic circuit, the application for the conventional controller is easy and the operation of the conventional controller is not needed to be changed.

Figure 8:
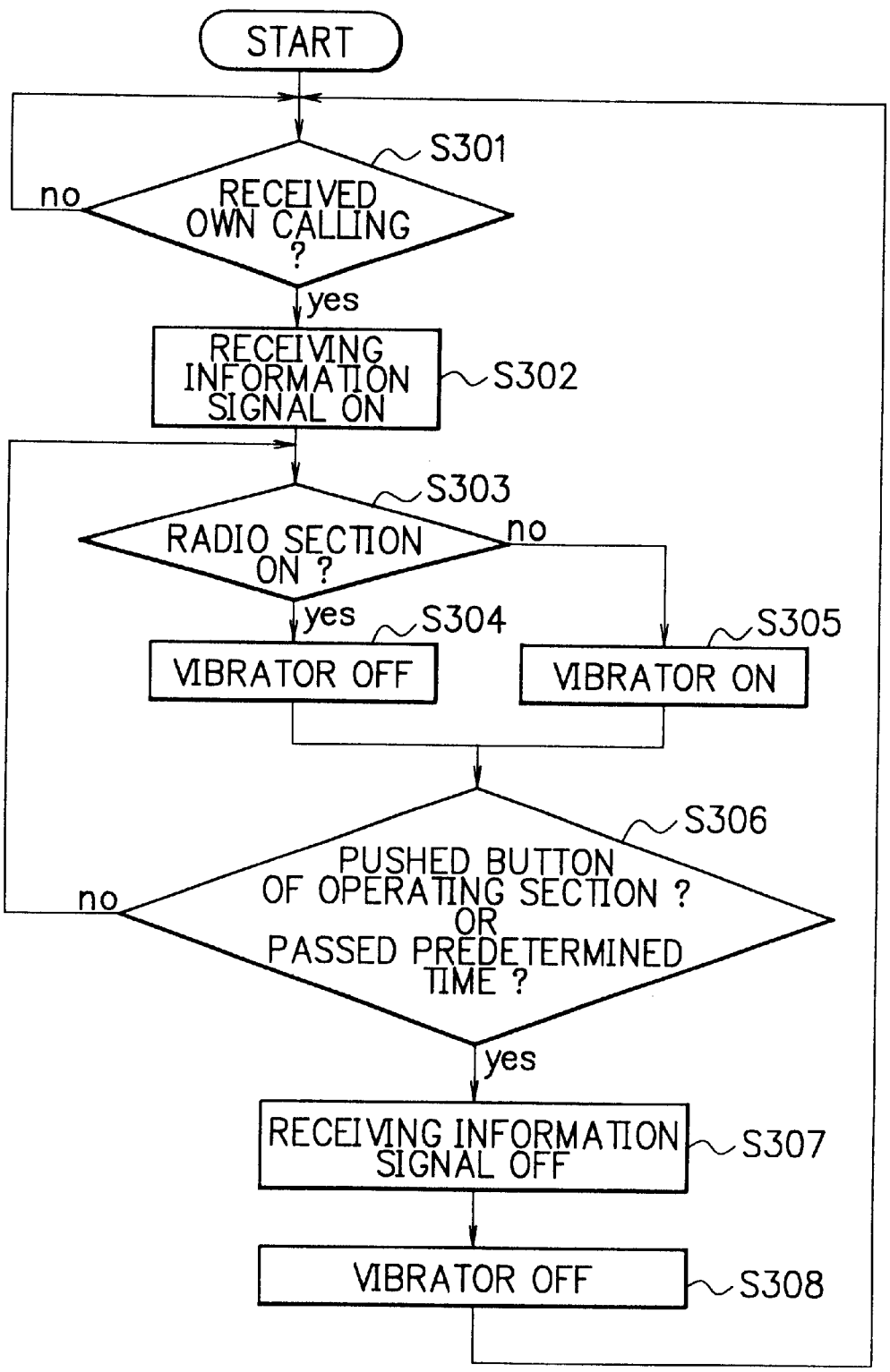
FIG. 8 is a flowchart showing the operation of the present invention.

FIG. 8 is a flowchart showing the operation of the present invention. With this flowchart, the operation of the present invention is explained. The controller 102 is usually at a standby state which is waiting for its own ID number allocated to the radio selective-calling receiver to be detected from the received data and at the time when its own calling is received (yes of step S301), the ID number is detected and the receiving information signal is turned on (step S302). Next, the timing whether this timing makes the radio section 101 on or not is judged (step S303) and at the case that this judgement is yes (yes of step S303), the switch 104 is turned off and the vibrator 103 is separated from the power supply 105 (step S304). On the contrary, at the case that this judgement is no (no of step S303), the switch 104 is turned on and the vibrator 103 is connected to the power supply 105 and the vibrator 103 is operated (step S305).

This operation of the vibrator 103 is continued until the judgement of the step S306 becomes "yes" by a predetermined button of the operating section 106 is pushed or predetermined time is passed. After above mentioned either condition is satisfied and the judgement becomes "yes", the receiving information signal is turned off (step S307) and the switch 104 is turned off and the vibrator 103 is separated from the power supply 105 and the vibrator 103 is stopped (step S308). After this, the operation returns to the step S301.

Figure 9:
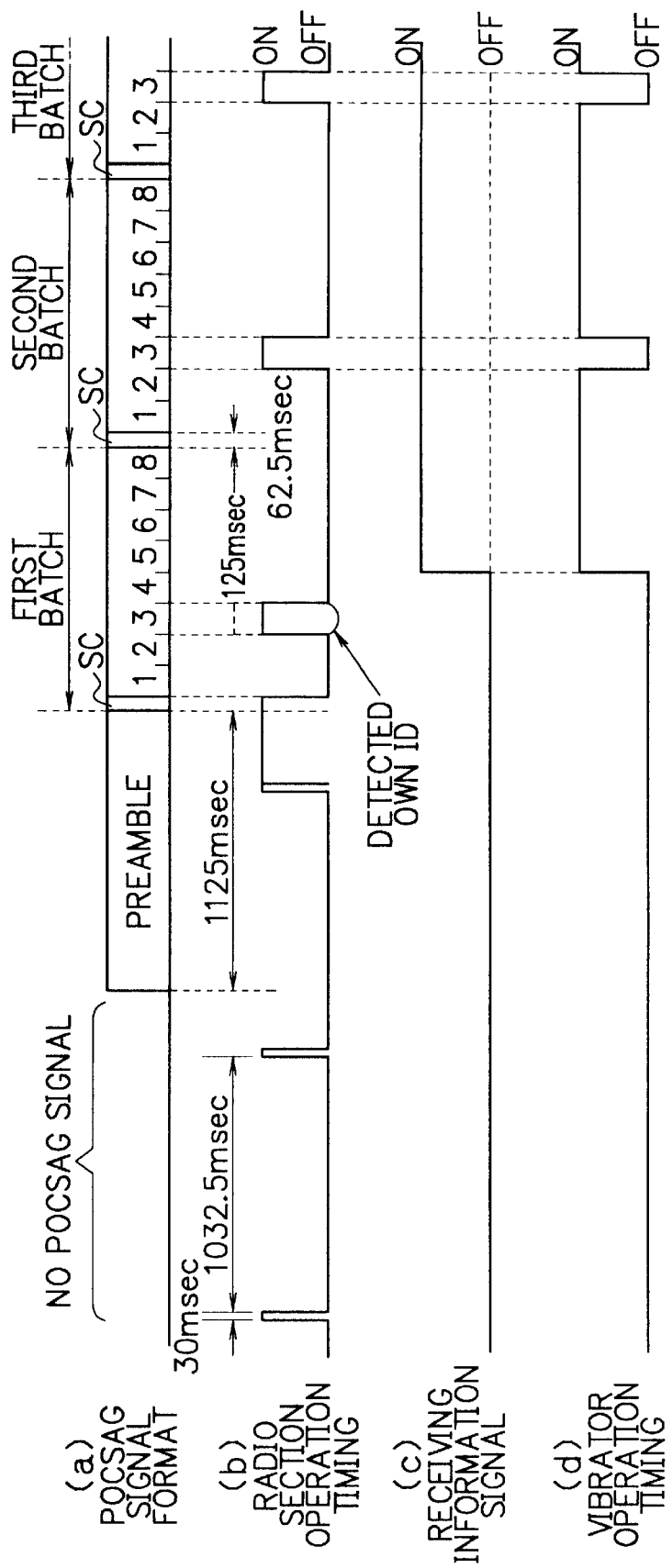
FIG. 9 is a timing chart showing the operation of the radio selective-calling receiver of the present invention.

FIG. 9 is a timing chart showing the operation of the radio selective-calling receiver of the present invention. FIG. 9(a) shows the POCSAG signal format being one of the signal formats of this radio selective-calling receiver. The POCSAG signal format is constituted of a preamble and plural batches and one batch is composed of a synchronization signal SC and eight frames.

FIG. 9(b) shows the operation timing (a radio section control signal) of the radio section 101 at the receiving time of this signal. In this case, the radio section 101 becomes turning on at the third frame at which its own ID number belongs. At and after the second batch, the synchronization signal SC is not received and at the third frame the radio section 101 becomes turning on.

FIG. 9(c) shows the receiving information signal. This shows that the receiving information signal becomes on after detecting its own ID number at the third frame of the first batch. By inputting this receiving information signal and the above mentioned radio section control signal (refers to FIG. 9(b)) to the logic circuit mentioned in FIG. 7, the vibrator control signal is generated. By this vibrator control signal, the switch 104 is turned on and the vibrator 103 is operated.

FIG. 9(d) shows the operation timing of the vibrator 103. As shown in FIG. 9(d), the operation timing of the vibrator 103 is intermittent and the vibrator 103 does not operate at the timing when the radio section 101 operates.

As mentioned above, at the time when the radio section 101 is on state, the vibrator 103 is separated from the power supply 105 by the operation of the switch 104, therefore the bad effect of the operating noise of the vibrator 103 influencing to the radio section 101 is avoided. Moreover, the current does not flow to the vibrator 103 and the voltage drop of the power supply 105 does not occur. Therefore, the characteristic of the radio section 101 does not deteriorate and the stable operation is able to be realized. Furthermore, because the vibrator 103 is intermittently operated, the consumption current is able to be decreased.

The present invention is not limited to the POCSAG format and is applicable to the other formats. For example, at the case that the FLEX-TD format, which is described in the standard RCR STD-43A of the FLEX-TD radio paging system published by ARIB (Association of Radio Industries and Businesses), is used as a signal format, the following application is possible. In this, FLEX is a registered trademark.

Figure 10:
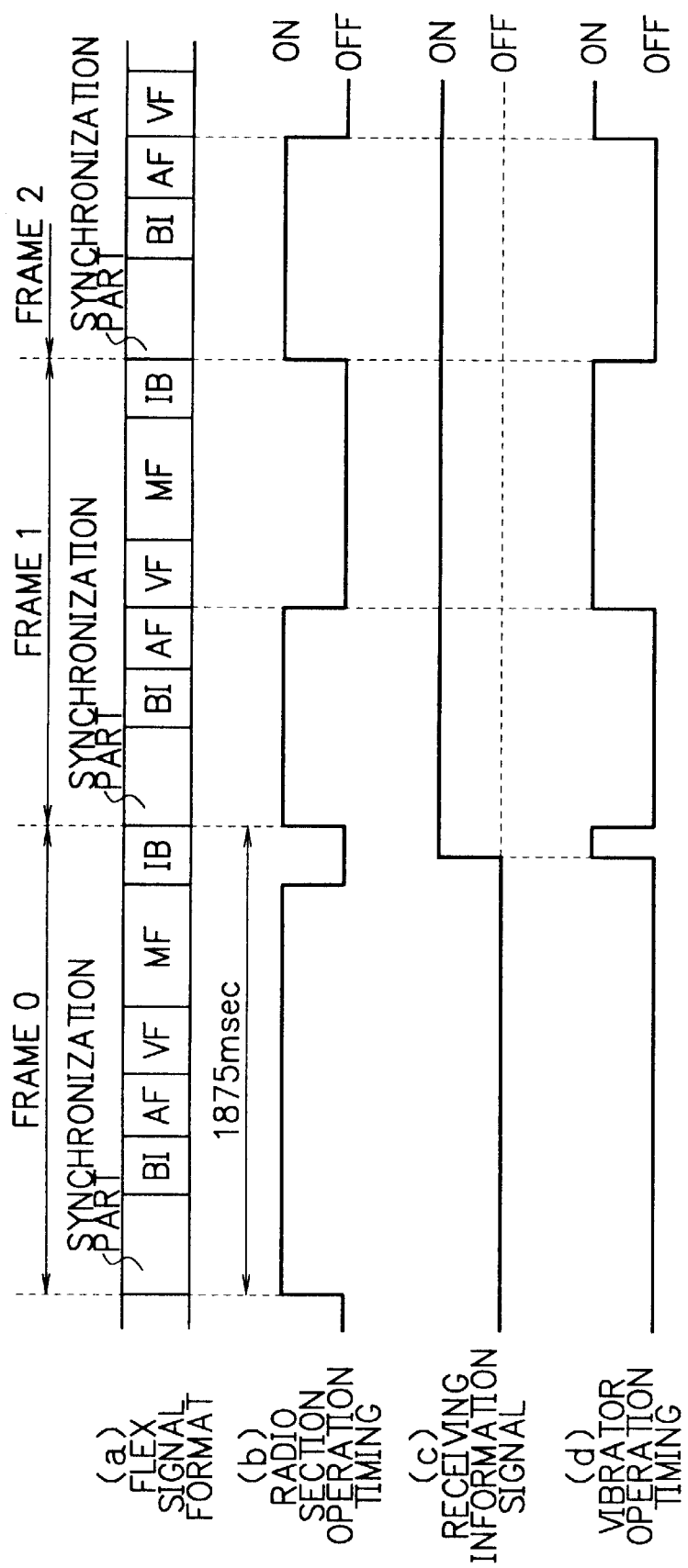
FIG. 10 is a timing chart showing signals in the FLEX-TD format.

FIG. 10 is a timing chart of signals in the FLEX-TD format. FIG. 10(a) shows the signal of the FLEX-TD format. This FLEX-TD format is composed of plural frames and one frame has six blocks.

FIG. 10(b) shows the operation timing of the radio section (a radio section control signal). As shown in FIG. 10(b), the radio section is turned on anticipating a synchronization part by a built-in timer. In this case, the radio section is turned on in each frame. In the BI (block information), there is the information of frame and system structure, that is, the BI has the position information of AF (address field) and VF (vector field). The AF has the information such as the ID address, at the time when its own ID number is detected, the AF reads the VF positioning at the next, and detects the kind of messages (figures, English letters) and the position information of the message and reads the message data in the MF (message field). After this, the radio section is turned off. The IB (idle block) is an unused block. This case is shown in the frame 0.

At the time when its own ID number is not detected at the AF, the radio section is turned off, this case is shown in the frame 1.

FIG. 10(c) shows the receiving information signal, FIG. 10(d) shows the operation timing of the vibrator. As it is clear from the operation shown in FIGS. 10(b), (c) and (d), even at the case that the different format is applied to the present invention, the operation is basically the same as the above mentioned POCSAG format.

In order to make the understanding of the present invention easy, at the embodiments of the present invention, only a vibrator is provided as a receiving information means, however, generally the other receiving information such as a speaker,and an LED are provided in the radio selective-calling receiver and its user is able to select one or ones from them beforehand.

Figure 11:
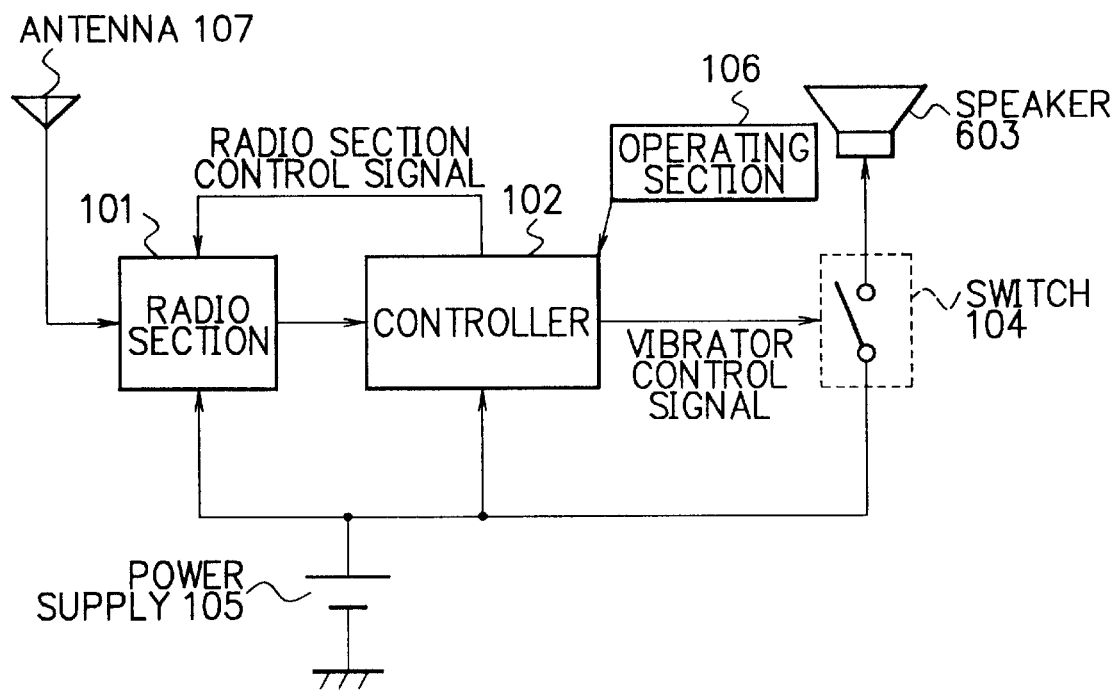
FIG. 11 is a block diagram showing an embodiment used a speaker as a receiving signal information means of the present invention.
Figure 12:
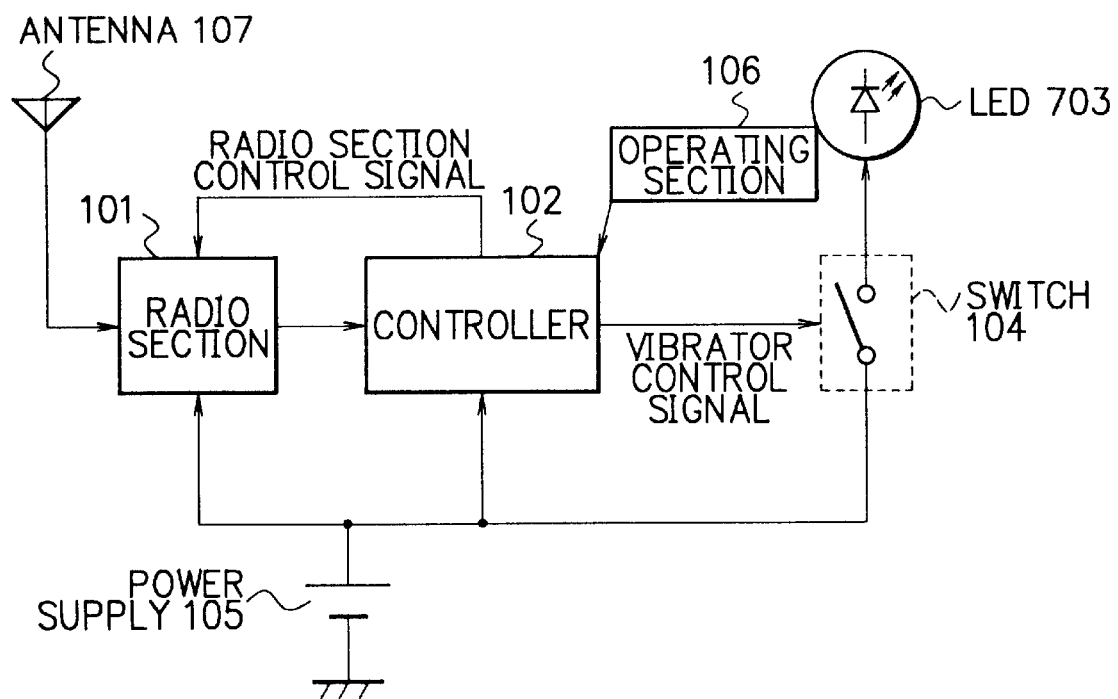
FIG. 12 is a block diagram showing an embodiment used an LED as a receiving signal information means of the present invention.

FIG. 11 is a block diagram showing an embodiment used a speaker as a receiving signal information means of the present invention. As shown in FIG. 11, the sound of speaker 603 informs the receiving calling at the radio selective-calling receiver. FIG. 12 is a block diagram showing an embodiment used an LED as a receiving signal information means of the present invention. As shown in FIG. 12, the flashing light of LED 703 informs the received calling at the radio selective-calling receiver. As mentioned above, the present invention is applicable to the radio selective-calling receivers providing any other information means.

As explained above, according to the radio selective-calling receiver of the present invention, the present invention provides a signal receiving means for receiving the transmitted signal, an informing means for informing the reception at the time when its own calling signal is received, a power supply which supplies the power to the signal receiving means and informing means and a control means which controls to break the supply of the power from the power supply to the informing means during the time of the operation of the signal receiving means. Therefore, the influence of the noise generated at the time when the received calling is informed to the user and the deterioration of the characteristic of the radio section are avoided and the increase of the cost and the big sized apparatus is able to be avoided.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A radio selective-calling receiver, comprising:
   a radio section adapted to receive and demodulate incoming radio messages;
   a controller receiving as inputs an output of the radio section and an operator input, the controller controlling the radio section to intermittently alternate between enabled and disabled states; and
   an indicator controlled by the controller to be inactive except when an incoming radio message addressed to the selective-calling receiver is received;
   wherein for each incoming radio message addressed to the selective-calling receiver, the controller repeatedly alternates between enabling the radio section and enabling the indicator so that only one of the radio section and the indicator is enabled at any time, the controller continuing the repeated alternation until an indicator termination condition is reached, at which point the indicator is made inactive until a next said incoming radio message addressed to the selective-calling receiver is received.

2. The radio selective-calling receiver of claim 1, wherein the indicator termination condition is reached when either a predetermined period of time has passed or the operator input is received.

3. The radio selective-calling receiver of claim 2, wherein the indicator comprises one of a vibrator, a speaker, and a LED.

4. The radio selective-calling receiver of claim 1, wherein the controller generates a radio section control signal which is received as an input by the radio section, an indicator control signal which is received as an input by the indicator, and a receiving information signal;
   wherein the receiving information signal is made active when an incoming radio message addressed to the selective-calling receiver is detected and made inactive when the indicator termination condition is reached.

5. The radio selective-calling receiver of claim 4, wherein the indicator termination condition is reached when either a predetermined period of time has passed or the operator input is received.

6. The radio selective-calling receiver of claim 5, wherein the controller puts the indicator control signal in an active state only when the receiving information signal is active and the radio section control signal is inactive.

7. The radio selective-calling receiver of claim 6, wherein the indicator comprises one of a vibrator, a speaker, and a LED.

8. The radio selective-calling receiver of claim 1, wherein the controller controls the indicator by selectively closing and opening a connection between the indicator and a power supply.

* * * * *